(12) United States Patent
Pino et al.

(10) Patent No.: US 8,416,939 B1
(45) Date of Patent: Apr. 9, 2013

(54) SYSTEM AND METHOD FOR PROVIDING SEAMLESS MUSIC ON HOLD

(75) Inventors: Fredrick Charles Pino, Naperville, IL (US); Jeffrey W. Anderson, Palatine, IL (US)

(73) Assignee: Walgreen Co., Deerfield, IL (US)

( * ) Notice: Subject to any disclaimer, the term of this patent is extended or adjusted under 35 U.S.C. 154(b) by 424 days.

(21) Appl. No.: 12/869,969

(22) Filed: Aug. 27, 2010

Related U.S. Application Data

(60) Provisional application No. 61/367,724, filed on Jul. 26, 2010.

(51) Int. Cl.
*H04M 3/42* (2006.01)
*H04M 1/64* (2006.01)

(52) U.S. Cl. ................ 379/211.01; 379/88.19

(58) Field of Classification Search .... 379/88.01–88.25, 379/211.01
See application file for complete search history.

(56) References Cited

U.S. PATENT DOCUMENTS

| | | | |
|---|---|---|---|
| 6,724,872 B1 * | 4/2004 | Moore et al. ............... | 379/93.35 |
| 6,738,615 B1 * | 5/2004 | Chow et al. .................. | 455/415 |
| 6,950,504 B1 * | 9/2005 | Marx et al. ................. | 379/88.19 |
| 7,248,677 B2 * | 7/2007 | Randall et al. ............. | 379/93.23 |
| 7,269,415 B2 * | 9/2007 | Bostrom et al. ............. | 455/419 |
| 7,286,821 B2 * | 10/2007 | Kraft et al. .................... | 455/415 |
| 7,746,996 B1 * | 6/2010 | Ruckart ................... | 379/211.01 |
| 2002/0025831 A1 * | 2/2002 | Kim .............................. | 455/554 |
| 2003/0108187 A1 * | 6/2003 | Brown et al. ........... | 379/266.03 |
| 2003/0156701 A1 * | 8/2003 | Burg et al. ................ | 379/215.01 |
| 2004/0072593 A1 * | 4/2004 | Robbins et al. .............. | 455/560 |
| 2004/0177077 A1 * | 9/2004 | Steele .......................... | 707/100 |
| 2004/0266426 A1 * | 12/2004 | Marsh et al. ............... | 455/426.2 |
| 2009/0219927 A1 * | 9/2009 | Hartog et al. ................ | 370/355 |

* cited by examiner

*Primary Examiner* — Mohammad Islam
(74) *Attorney, Agent, or Firm* — Francis C. Kowalik; Marshall, Gerstein & Borun LLP; Randall G. Rueth

(57) ABSTRACT

A method of using a computer to provide music on hold, including receiving a telephone call from a caller; determining that the telephone call is to be put on hold at a computer at a first location; using the computer to retrieve from a memory coupled to the computer a music genre corresponding to a telephone number for the telephone call, wherein the telephone number corresponds to a second location; sending a request to a media server for a music file containing music fitting the music genre corresponding to the second location, wherein the media server has stored therein music files for a plurality of genres for a plurality of locations; and streaming via the media server the music file containing music fitting the music genre corresponding to the second location to the caller.

15 Claims, 8 Drawing Sheets

SYSTEM AND METHOD FOR PROVIDING SEAMLESS MUSIC ON HOLD

CROSS REFERENCE TO RELATED APPLICATION

This application claims the benefit of U.S. Provisional Application No. 61/367,724 filed Jul. 26, 2010, and is entirely incorporated by reference herein.

TECHNICAL FIELD

The present disclosure generally relates to a system for providing music on hold for seamless transfer of calls.

BACKGROUND

Many companies and organizations have multiple facilities located throughout the country or even across the world. Often times the facilities will play different types or genres of music both in the facility and when a call to the facility is placed on hold. For example, a facility in Nashville, Tenn. may play country music for calls to its facility that are placed on hold. And, calls placed to another facility may play rap or classic rock. It is not uncommon for customers, clients or members calling one facility to have their call re-routed to another facility. When this re-routing occurs, the genre of music played when the caller is placed on hold at the other facility may be substantially different from the genre of music played at the first facility, making it apparent to the caller that his or her call was transferred to a facility far away from them.

Transferring calls to locations far away from a caller often annoys the caller. Thus, many companies try to make the transfer of calls to remote locations as transparent as possible. The invention described below describes one way to make the transfer of calls as transparent as possible.

BRIEF DESCRIPTION OF THE DRAWINGS

For a fuller understanding of the scope and nature of the invention, as well as the preferred mode of use, reference should be made to the following detailed description read in conjunction with the accompanying drawings. In the following drawings, like reference numerals designate like or similar parts throughout the drawings.

DETAILED DESCRIPTION

The detailed descriptions of the process of the present invention are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated.

Useful devices for performing the software implemented operations of the present invention include, but are not limited to, general or specific purpose digital processing and/or computing devices, which devices may be standalone devices or part of a larger system. The devices may be selectively activated or reconfigured by a program, routine and/or a sequence of instructions and/or logic stored in the devices, to accomplish the features and functions of image detection and decoding of the present invention described herein. In short, use of the methods described and suggested herein is not limited to a particular processing configuration.

Figure 1:
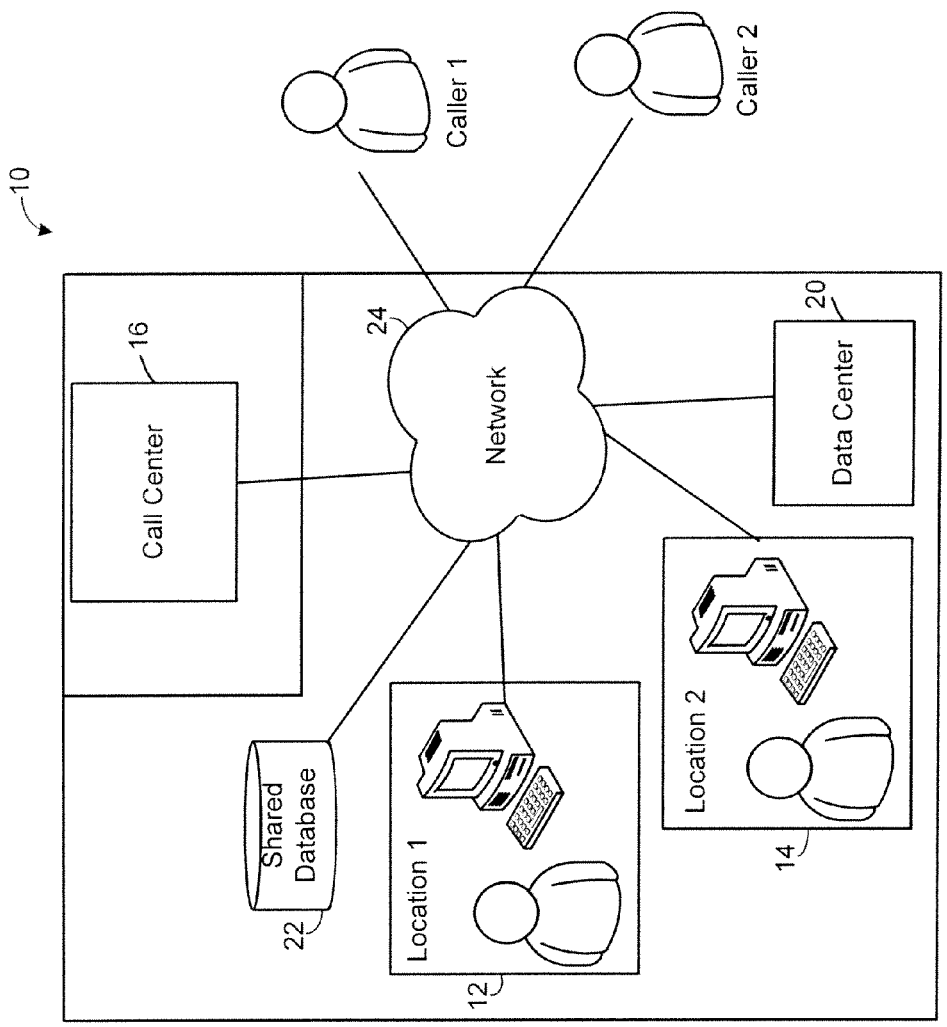
FIG. 1 illustrates an exemplary network of locations.

FIG. 1 illustrates a company or organization's exemplary network 10 of locations to which telephone calls may be transferred there between. The network 10 includes a first location 12, a second location 14, a call center 16, a data center 20 and a shared database 22, all coupled together via a network 24. Generally, the network 24 may be used to communicatively couple different computers associated with different entities or resources of a company or organization. The system 10 may correspond, for example, to a pharmacy retail network including a plurality of pharmacy resources. Pharmacy resources may include retail resources, such as pharmacy retail stores 12 and non-retail resources, such as the call center 16. The network 24 may be completely controlled (e.g., owned) by the pharmacy retail network or may be partially owned and controlled by the pharmacy retail network. For example, a portion of the network 24 may be a private network that is controlled by the pharmacy retail network and a portion of the network may be coupled to the Internet.

In the network of connected locations, a caller may interact with an employee for a variety of reasons. For example, the caller may wish to speak to, for example, speak to a pharmacist or technician or refill a prescription.

In the computing system 10 described herein, telephone calls may be routed to the call center 16, the data center 20 or one of the locations 12, 14.

The call center may be staffed to include a set of registered pharmacists and/or non-registered pharmacists (also called technicians) that answer calls from the callers. It should be noted that while some tasks may be performed by registered and non-registered pharmacists, some information processing may be reserved only for registered pharmacists, such as clinical review and drug utilization review. Thus, members of the staff may be assigned specific jobs. The call center 16 may be adapted to include call center functions such as enabling a registered physician at the central facility to talk to a customer to consult/counsel/advise the customer or third parties (e.g., insurance companies or payment processing entities). The call center may be adapted to perform further functions as well.

Space, equipment, work day limitations due to the facility being located in a different time zone, time thresholds, and other limitations of a particular call center or data center may limit the effectiveness of the staff or the facility, itself. Accordingly, in some embodiments, more than one call center and/or data center may be used in the network.

Figure 2A:
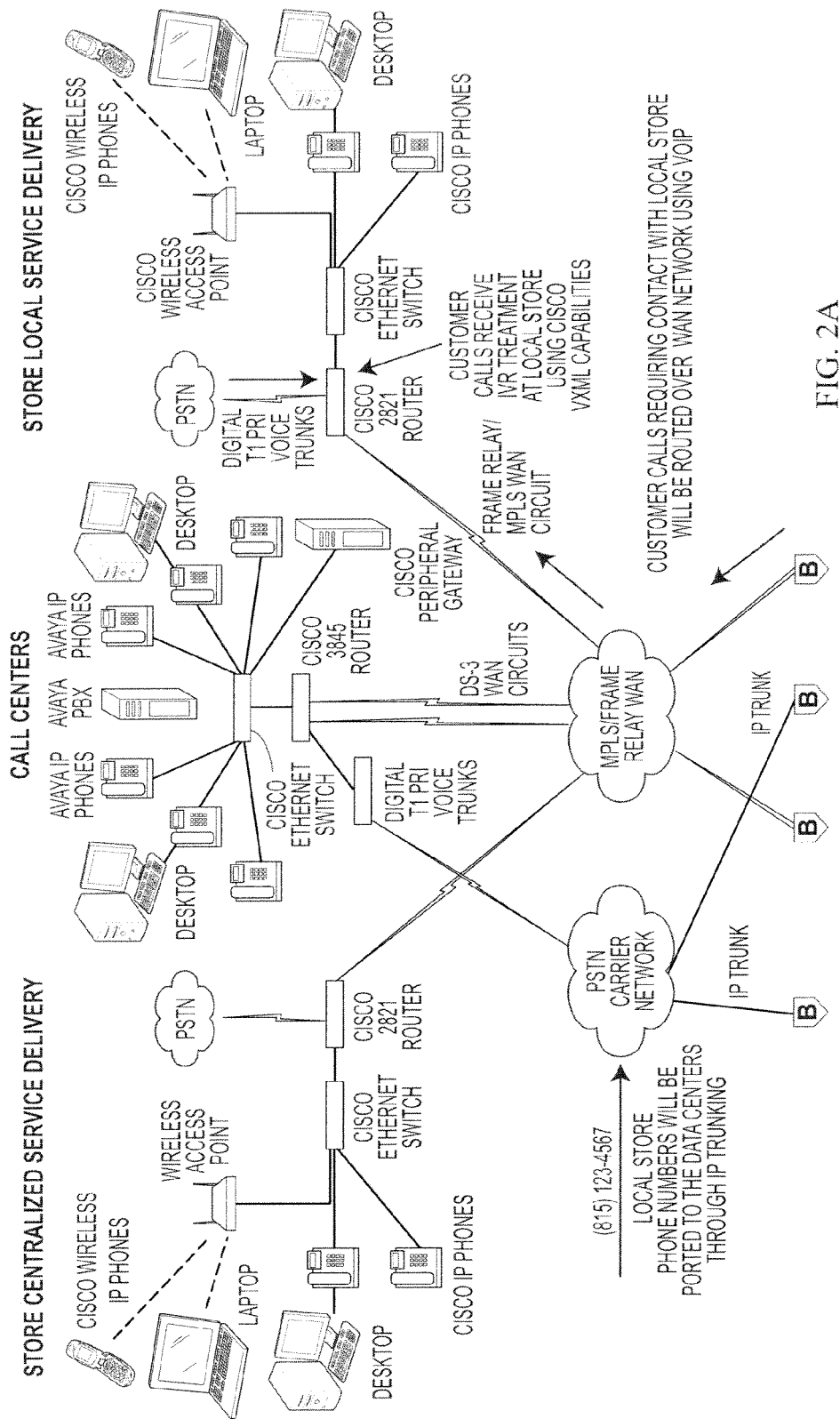
FIGS. 2A and 2B illustrate an exemplary network architecture.
Figure 2B:
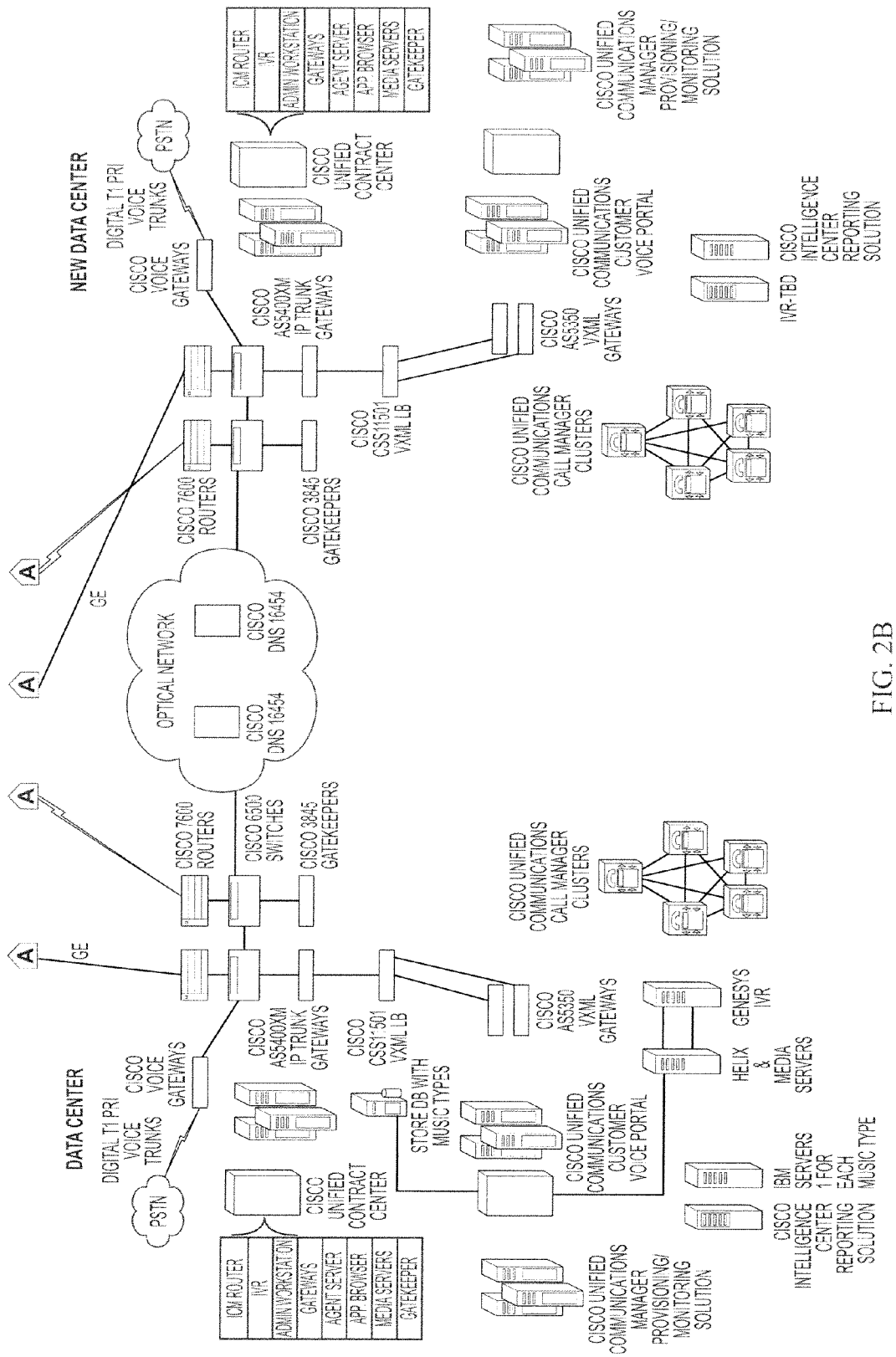

FIGS. 2A and 2B illustrate an exemplary network architecture 100. The architecture 100 includes a number of hardware components associated with a store centralized service delivery 102, a number of call centers 104 and a store local services delivery 106. If a customer calls a local store telephone number as illustrated at 110, the telephone call may be ported to a data center 112 via the network 114. The data center 112 is illustrated in FIG. 2B. The call could alternatively be routed to a second data center 116, or any other suitable data center.

When the telephone call is routed to the data center 112, it may pass through a number of Cisco routers 120, 122 and a Cisco IP trunk gateway 124. The telephone call may then be routed to a CVP 130. The CVP 130 or then lookup and location data and a corresponding number that was called by the customer. The telephone call may then be transferred to the IVR 126. If it is determined at the IVR that the call is to be transferred to a second location, then the call will be put on hold while a request for a music file is sent to the helix & media server 132. One of ordinary skill in the art will understand that a load balancer may also be utilized if more than one media server is utilized by the system.

Once the selected media server obtains the media file for the appropriate type of music corresponding to the telephone number called by the customer, then the media server 132 will stream music having the appropriate genre to the call. The streaming of music may be routed through a number of call paths available at the data center 112. In this way, the caller will hear the same music type as is played in their local store. The media server 132 may store media files for a large number of types or genres of music. For example, the media server 132 may store 18 different genres of music. Furthermore, the media server 132 may store a plurality of music files for each genre of music. Thus, one file can be used to stream music to callers while the second file is updated to ensure a fresh supply of music. When the music in the first file has been played, then the media server 132 will switch over and retrieved the second file whenever it is needed and stream it to a caller. While the second file is being streamed, the first file can be replaced with new music. This process can be repeated periodically. An example file may contain 30 minutes of music. While not shown in FIG. 2B, the media server 132 may be coupled to a plurality of music servers and/or media encoders. These will be explained in more detail below.

The data center 116 may include components and interconnections similar to the data center 112 described above. The data center 116 may be used to handle overflow call traffic or simply as a backup in the event of a technical failure with data center 112.

If it is determined that the telephone call needs to be routed to another location, such as a store within the network, then the call may be put on hold again while it is being routed to the store and music having the appropriate genre will be again played for the customer.

Figure 3:
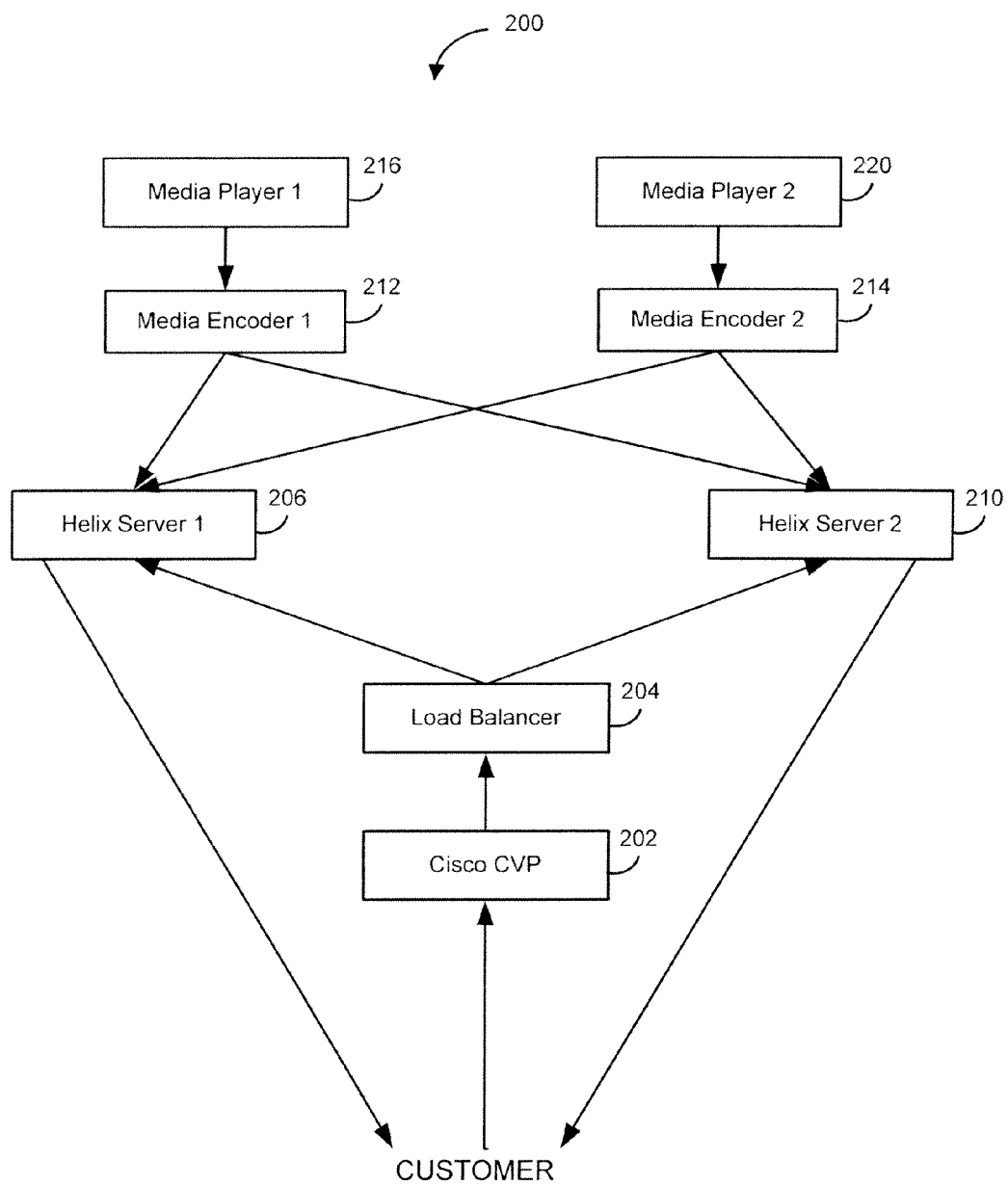
FIG. 3 is an exemplary block diagram representing a music on hold system.

FIG. 3 illustrates an exemplary architecture 200 for a music on hold system. The architecture 200 illustrates that when a call enters the system 200, it will hit a Cisco CVP 202. The CVP 202 pass the call to a load balancer 204. Those of ordinary skill in the art will understand that a load balancer is not necessary, particularly if only a single is utilized. The load balancer 204 may then route the call to one or more helix media servers 206, 210. The media servers 206, 210 music having an appropriate music type/genre to the caller. Each of the media servers 206, 210 are coupled to media encoders 212, 214. The media encoder 212 is coupled to a media player 216 and the media encoder 214 is coupled to the media player 220. The architecture 200 may include a separate media player and media encoder for each genre of music available.

For example, if eighteen genre's of music are available, then there will be eighteen separate media players and media encoders.

The media players 216, 220 maybe configured to transfer music in an analog format to the appropriate and connected media encoder 212, 214. The media encoder 212 may then convert the first genre audio from analog to a digital file in the Windows media audio format (WMA). Then, the WMA files may be converted to a VoIP format using for example a software algorithm available the shareware. Likewise, the media player 220 may send analog music of a second genre to the media encoder 214 where it is converted from analog to a digital WMA file and again converted to a VoIP format that is capable of being streamed to the caller.

Figure 4:
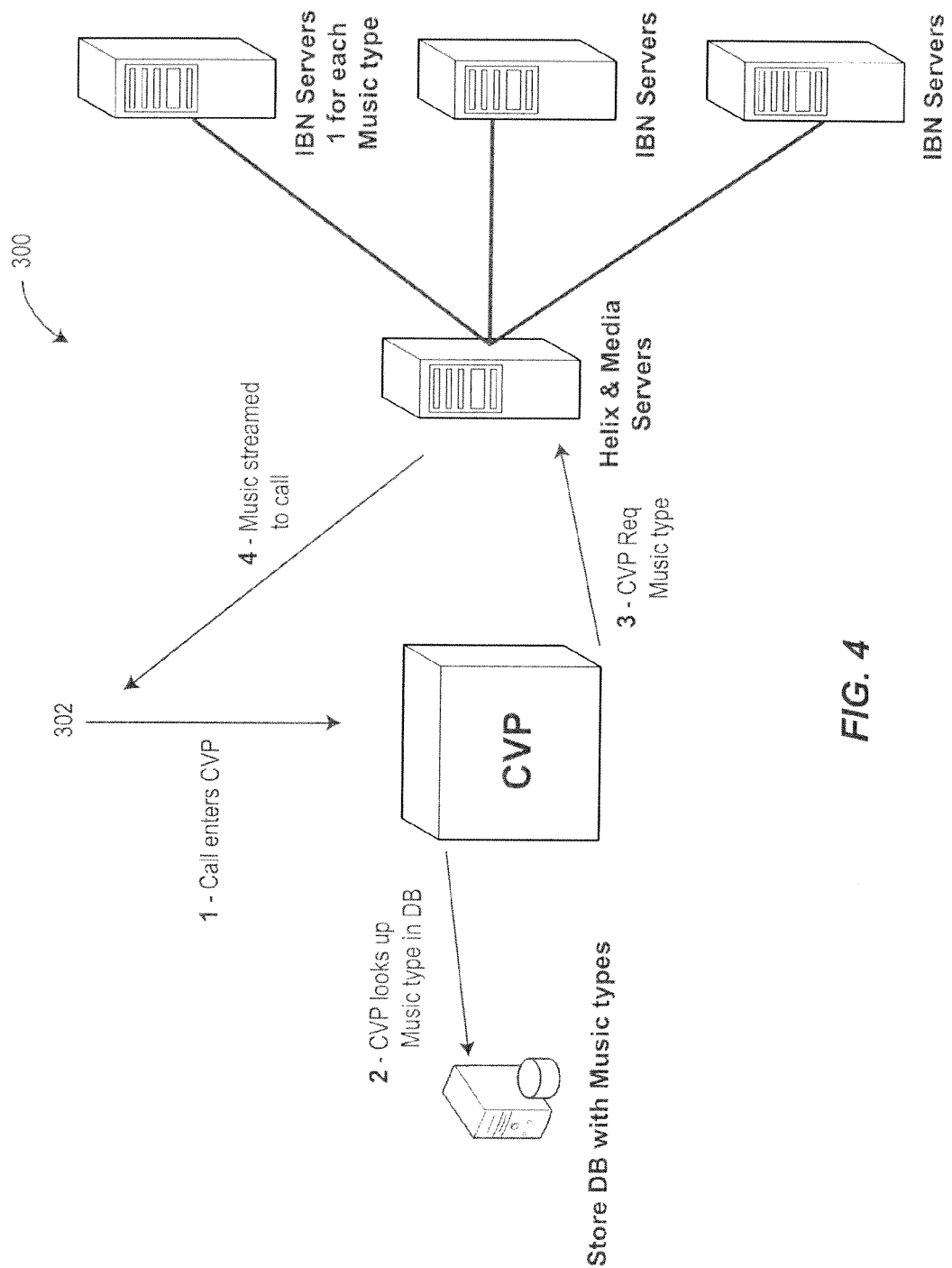
FIG. 4 is another exemplary block diagram representing a music on hold system.

FIG. 4 illustrates another exemplary architecture 300 that may be utilized to deliver music on hold having an appropriate genre to a caller that is calling a local store or location. The architecture 300 illustrates that when a call enters a CVP at 302, the CVP will look up in database or memory the appropriate music type associated with the telephone number called. In other words, the database or memory will store for example, in a lookup table, and appropriate music type for each telephone number for each store or location in a network of locations that is owned by a company or organization. This method could take on a variety of details relative to the level of detail that is necessary for the application. For example, the system could be designed to look up only information based on the NPA/NXX off the number called, or it could look up the music genre information for the entire number that was called. If the entire number is utilized, then every store or location in the network can have a genre type of music associated therewith.

Still referring to FIG. 4, the CVP will transfer a request for an appropriate music type to a helix media server. As seen in architecture 300, only a single media server is utilized. However, multiple media servers may be utilized when necessary or appropriate. If multiple media servers are utilized, a load balancer is likely to be used also so that calls may be routed between the multiple media servers. A round robin or alternating routing algorithm is one possible way to route calls between media servers.

The media servers are connected to a plurality of IBN media servers to receive music in analog format for each genre of music that is available. As discussed in FIG. 3, media encoders may also be interconnected between the media servers and the IBN servers.

Figure 5:
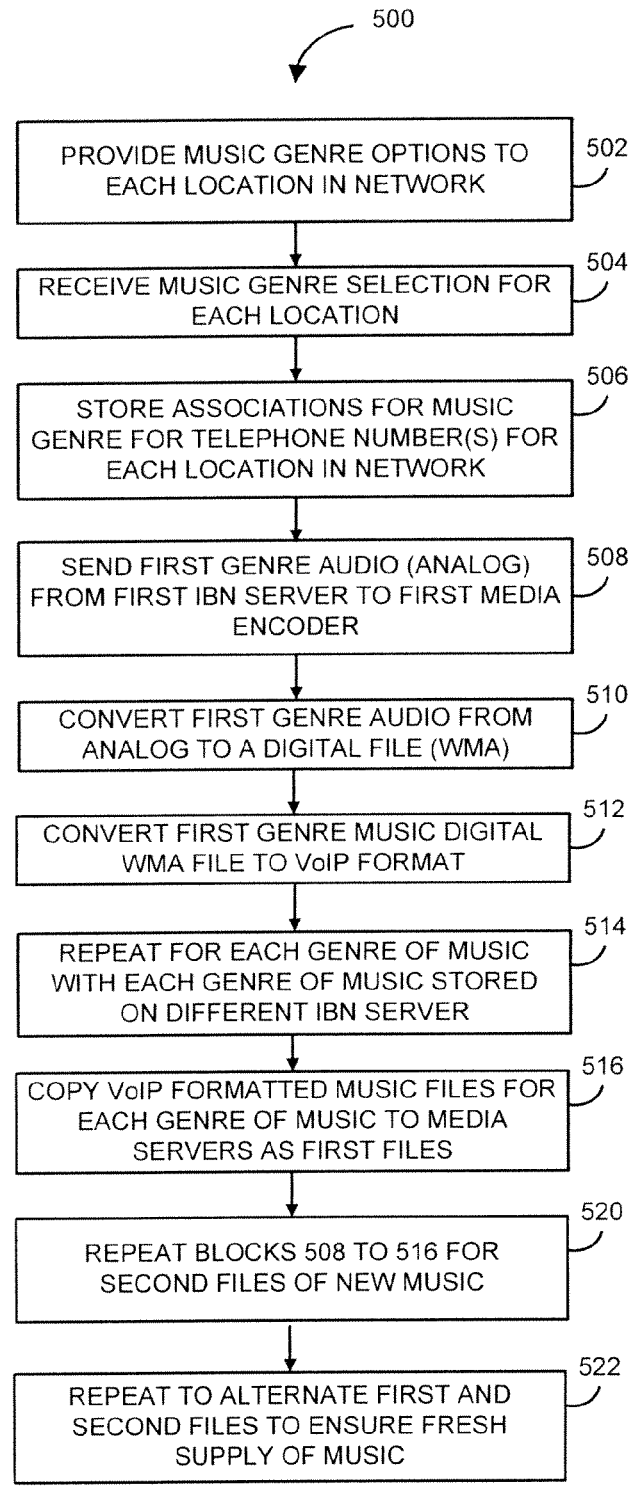
FIG. 5 is a flow chart illustrating an example method 500 of providing music files to a media server.

FIG. 5 illustrates an exemplary flowchart 500 that may be utilized in conjunction with any of the architectures illustrated above to play music on hold having an appropriate genre that enables calls to be transferred to remote locations in a transparent fashion. The algorithm 508 may begin at an initial stage when a company or organization provides each location or store within its network the option to select a music genre that is most appropriate for its location and customers (block 502). A central location or data center for the company or organization may then receive the music genre selections for each location within its network (block 504). The method 500 may then store associations for music genre for telephone numbers for each location in the network (block 506).

A first genre of audio in an analog format may be sent from a first media player/server to a first media encoder (block 508). The first genre of audio may be converted from analog to digital file having a Windows media audio (WMA) format (block 510). The method 500 and then convert the first genre of music in digital WMA format to a VoIP format (block 512). This process may be repeated for each genre of music, where each genre of music is stored or played from a different media player (block 514). Each VoIP format a music file may then be copied to the Heliz media servers (block 516). These VoIP format of music files may be copied as first files and may exist separately for each genre of music that is available in the network. The method 500 may also include repeating this process so that second VoIP files may exist to ensure that fresh music is continuously available (block 520). This may occur by updating one of the first or second files while the other is being streamed to callers (block 522). This process may occur by scheduling two tasks to run 30 minutes apart, for example, on the computer running the Windows Media Encoder. Each scheduled task then runs a batch file which starts an encoder file for 60 seconds, for example. Thus a 60 second WMV file is created. A program then converts the WMV file to a wave file, which is then copied to the media servers.

Figure 6:
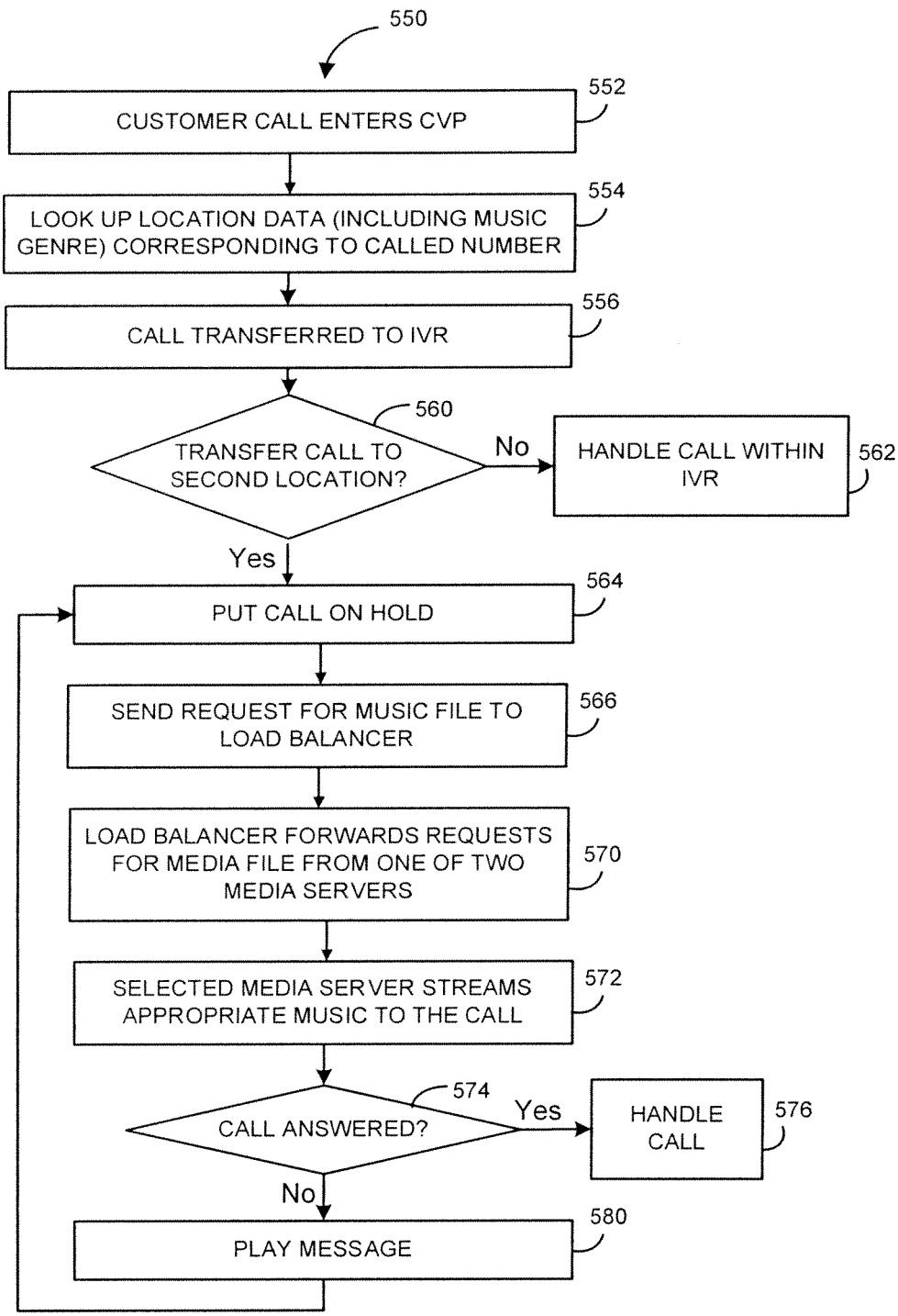
FIG. 6 illustrates an exemplary flowchart for a seamless music on hold algorithm 550.

FIG. 6 illustrates an exemplary flowchart for a transparent music on hold algorithm 550. The algorithm 558 began when a customer call enters a CVP (block 552) and a lookup of location data including a music genre corresponding to the called number is performed (block 554). The call may then be transferred to an IVR (block 556) where it is determined if the call needs to transfer to a second location (block 560). If the call does not need to be transferred, then it may be handled within the IVR (block 562). If it is determined at the block 560 that the call is to be transferred to a second location, then the telephone call may be put on hold (block 564). A request may then be sent for music file to a load balancer (block 566), which may thereafter forward the request for the media file to one of a plurality of media servers (block 570). The selected media server or then streams the appropriate music to the call so that music of the genre that is played at the local store is also played to the customer when the call is on hold (block 572). After the telephone call is put on hold at block 572, the algorithm 550 may determine if the call has been answered (block 574). If the call is answered, that it will be handled and appropriate manner (block 576). If the telephone call is not answered after a predetermined period of time, then a subsequent message may be played to the caller (block 580) and the routine loops back to block 564 where the telephone call is once again put on hold.

Figure 7:
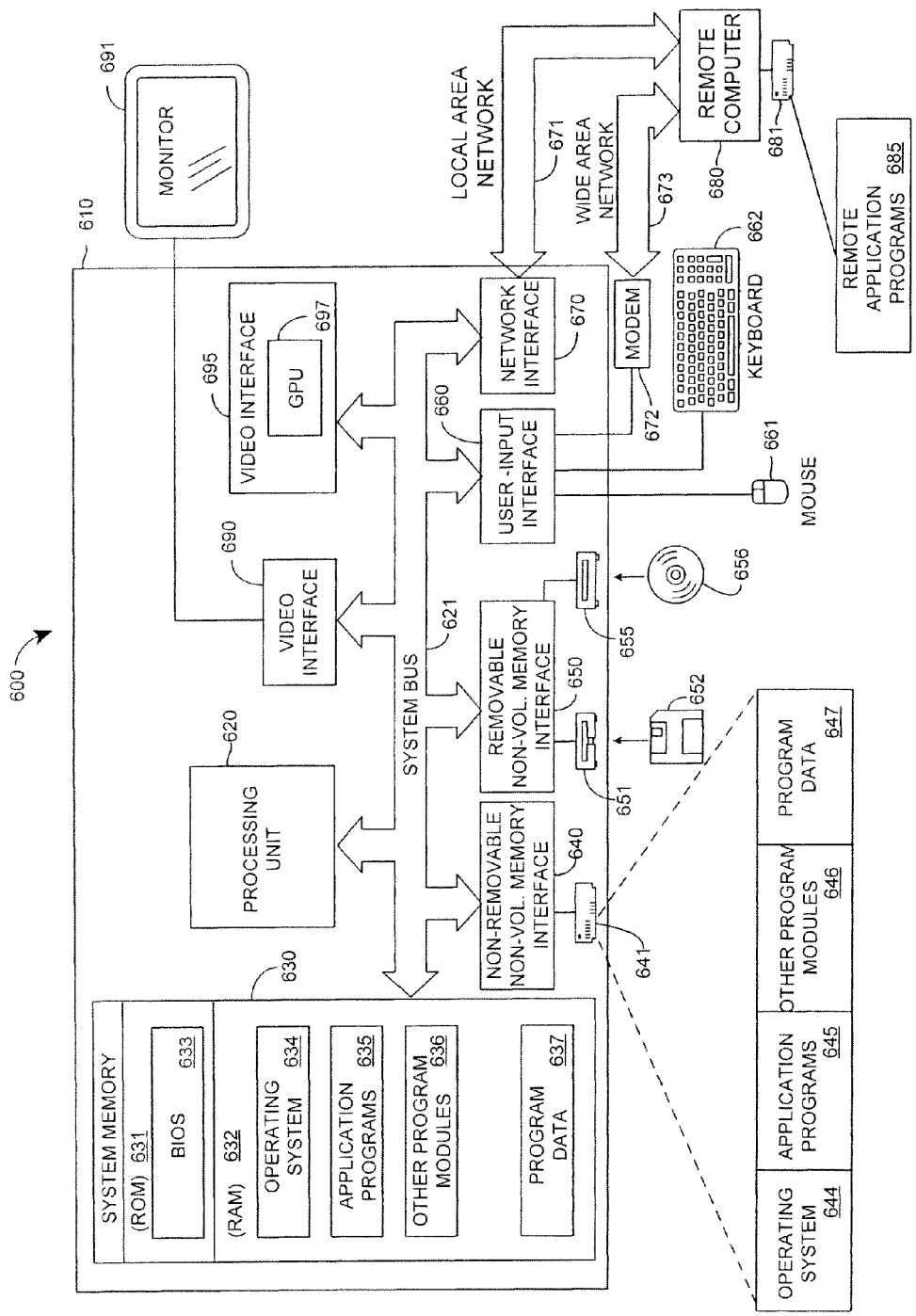
FIG. 7 illustrates an example computing device that may be used in a music on hold system.

Referring again to the flowcharts described above, at least some of the blocks may be implemented utilizing the controller illustrated in FIG. 7. The controller may be part of a computer system to provide music on hold, an example of which is illustrated in FIGS. 2-4. FIG. 7 thus illustrates an example computing device in the form of a computer 610 that may be used to provide music on hold as discussed above.

Components of the computer 610 may include, but are not limited to a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory, or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 7 illustrates operating system 644, application programs 645, other program modules 646, and program data 647.

The computer 610 may also include other removable/non-removable, volatile/nonvolatile computer storage media. By way of example only, FIG. 7 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 7, provide storage of computer readable instructions, data structures, program modules and other data for the computer 610. In FIG. 7, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 20 through input devices such as a keyboard 662 and cursor control device 661, commonly referred to as a mouse, trackball or touch pad. A camera 663, such as web camera (webcam), may capture and input pictures of an environment associated with the computer 610, such as providing pictures of users. The webcam 663 may capture pictures on demand, for example, when instructed by a user, or may take pictures periodically under the control of the computer 610. Other input devices (not shown) may include a microphone, joystick, game pad, satellite dish, scanner, or the like. These and other input devices are often connected to the processing unit 620 through an input interface 660 that is coupled to the system bus, but may be connected by other interface and bus structures, such as a parallel port, game port or a universal serial bus (USB). A monitor 691 or other type of display device is also connected to the system bus 621 via an interface, such as a graphics controller 690. An additional graphics controller 695 with may be connected to the system 621, where the GPU 697 of the additional graphics controller 695 may be used for offloading floating point calculations to the GPU 697.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 7. The logical connections depicted in FIG. 7 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the input interface 660, or other appropriate mechanism. In a networked environment, program modules depicted relative to the computer 610, or portions thereof, may be stored in the remote memory storage device. By way of example, and not limitation, FIG. 7 illustrates remote application programs 685 as residing on memory device 681.

The communications connections 670, 672 allow the device to communicate with other devices. The communications connections 670, 672 are an example of communication media. The communication media typically embodies computer readable instructions, data structures, program modules or other data and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

The invention claimed is:

1. A method of using a computer to provide music on hold, comprising:
   receiving a telephone call from a caller;
   determining that the telephone call is to be put on hold at a computer at a first location;
   using the computer to retrieve from a memory coupled to the computer a music genre corresponding to a telephone number for the telephone call, wherein the telephone number corresponds to a second location; transferring the telephone call from the computer to a load balancer, the load balancer selecting a media server from a plurality of media servers;
   sending a request to the media server for a music file containing music fitting the music genre corresponding to the second location so that the music genere that is played at the second location is also played to the caller at the first location when the caller is on hold, wherein the media server has stored therein music files for a plurality of genres for a plurality of locations; sending music from the music genre corresponding to the second location in analog format to a media encoder for converting to a digital VoIP format; and
   streaming via the media server the music file containing music fitting the music genre corresponding to the second location to the caller.

2. The method of claim 1, further comprising storing associations for music genres for each telephone number for a plurality of locations in a network.

3. The method of claim 1, further comprising coupling a plurality of media players to the media server, wherein each of the plurality of media players stores music of a different music genre.

4. The method of claim 1, further comprising converting the analog music sent to the media encoder to a Windows Media Audio (WMA) digital format.

5. The method of claim 4, further comprising converting WMA digital music to a VoIP format before streaming it to the caller.

6. The method of claim 5, further comprising storing two files of converted VoIP music for each genre on the media server.

7. The method of claim 6, further comprising periodically updating in an alternating fashion one of the two files of converted VoIP music on the media server to ensure the availability of fresh music.

8. The method of claim 1, further comprising:
   receiving a second telephone call from a second caller;
   determining that the second telephone call is to be put on hold at the computer at the first location;
   using the computer to retrieve from the memory coupled to the computer a music genre corresponding to a telephone number for the second telephone call, wherein the telephone number corresponds to a third location;
   sending a request to the media server for a music file containing music fitting the music genre corresponding to the third location, wherein the music genre corresponding to the third location is different from the music genre corresponding to the second location;
   streaming via the media server the music file containing music fitting the music genre corresponding to the third location to the second caller.

9. The method of claim 1, further comprising:
   removing the telephone call from hold;
   determining that the telephone call is to be put on hold a second time;
   using the computer to retrieve from the memory coupled to the computer the music genre corresponding to the telephone number for the telephone call, wherein the telephone number corresponds to the second location;

sending a request to the media server for a music file containing music fitting the music genre corresponding to the second location; and streaming via the media server the music file containing music fitting the music genre corresponding to the second location to the caller so that the genre of music streamed to the caller remains the same each time the caller is put on hold.

10. A system to provide music on hold, comprising:

a first location coupled to a second location via a VoIP network;

the first location including:

a customer voice portal including a processor and a memory coupled to the processor, wherein the memory has stored therein computer-readable instructions that are executable by the processor, wherein the instructions, when executed by the processor, cause the processor to:

identify a music genre corresponding to a telephone number for a telephone call when the telephone call is placed on hold, wherein the telephone number corresponds to the second location; transferring the telephone call from the computer to a load balancer, coupled to the customer voice portal and the first and second media servers, wherein the load balancer is configured to distribute calls to the first and the second media servers;

and request a music file corresponding to the identified music genre from the first and the second media server for the telephone call placed on hold so that the music genere that is played at the second location is also played to the caller at the first location when the caller is on hold, wherein the media server has stored therein music files for a plurality of genres for a plurality of locations;

a first and a second media server coupled to the customer voice portal;

a first and a second media encoder, each of which are coupled to each of the first and the second media servers;

a first media player coupled to the first media encoder;

a second media player coupled to the second media encoder;

wherein the first media player includes a processor and a memory coupled to the processor, the memory having stored therein analog music of a first genre, the first music genre corresponding to the identified music genre for the telephone call placed on hold;

wherein the second media player includes a processor and a memory coupled to the processor, the memory having stored therein analog music of a second genre; transferring the telephone call from the computer to a load balancer, coupled to the customer voice portal and the first and second media servers, wherein the load balancer is configured to distribute calls to the first and the second media servers;

sending music from the music genre corresponding to the second location in analog format to a media encoder for converting to a digital VoIP format; and wherein the first media player is configured to stream digital music of the first genre to the telephone call placed on hold.

11. The system of claim 10, wherein the customer voice portal memory has stored therein associations for music genres for each telephone number for a plurality of locations in the system.

12. The system of claim 10, wherein the first media encoder is further configured to convert the analog music of a first genre to a Windows Media Audio (WMA) digital format.

13. The system of claim 12, wherein the first media encoder is further configured to convert the WMA digital music to a VoIP format and copy the converted file to the first and second media servers.

14. A non-transitory computer-readable medium for use with a computer system provide music on hold, the non-transitory computer-readable medium having stored therein a program that, when executed on a processor, causes a computer to execute a process comprising:

determining that the telephone call is to be put on hold at a computer at a first location;

retrieving from a memory coupled to the computer a music genre corresponding to a telephone number for a telephone call from a caller, wherein the telephone number corresponds to a second location; transferring the telephone call from the computer to a load balancer, the load balancer selecting a media server from a plurality of media servers;

sending a request to the media server for a music file containing music fitting the music genre corresponding to the second location, so that the music genere that is played at the second location is also played to the caller at the first location when the caller is on hold, wherein the media server has stored therein music files for a plurality of genres for a plurality of locations; sending music from the music genre corresponding to the second location in analog format to a media encoder for converting to a digital VoIP format; and causing the media server to stream the music file containing music fitting the music genre corresponding to the second location to the caller.

15. The non-transitory computer-readable medium of claim 14, further comprising instructions to cause the media server to store two files of converted VoIP music for each genre of music stored on the medial server.

* * * * *